United States Patent [19]

Hitchcock et al.

[11] 4,450,882
[45] May 29, 1984

[54] AUTOMATIC SHAPER

[76] Inventors: Lonnie G. Hitchcock, Rte. 2, Box 60C, Rock Island, Tenn. 38581; Richard J. Flanigan, Rte. 12, McMinnville, Tenn. 37110

[21] Appl. No.: 311,428

[22] Filed: Oct. 14, 1981

[51] Int. Cl.³ .......................... B27C 5/00; B23C 3/04; B23Q 35/00
[52] U.S. Cl. .......................... 144/145 A; 144/134 A; 144/252 R; 144/242 D; 407/97; 407/110
[58] Field of Search ............... 144/144 A, 143, 144.5, 144/145 R, 145 A, 145 C, 139, 249 R, 154, 372; 83/565, 442; 409/104, 111, 112, 122, 123, 97; 408/3; 279/3; 269/21, 23, 238, 93

[56] References Cited

U.S. PATENT DOCUMENTS

| | | | |
|---|---|---|---|
| 2,720,141 | 10/1955 | Seyferth | 144/145 R |
| 2,945,523 | 7/1960 | Jenkins | 269/23 |
| 3,534,658 | 10/1970 | Carsey | 409/137 |
| 3,538,883 | 11/1970 | Polin | 279/3 |
| 3,729,206 | 4/1973 | Cachon et al. | 269/21 |
| 3,739,826 | 6/1973 | Schell | 144/145 R |
| 3,880,048 | 4/1975 | Zimmerman | 409/97 |
| 4,244,253 | 1/1981 | Flanigan | 83/439 |

*Primary Examiner*—W. D. Bray
*Assistant Examiner*—Jorji M. Griffin

[57] ABSTRACT

A highly productive completely automatic tracing shaper machine tool performs sequential operations without manual attention permitting a single operator to simultaneously run several machines without being exposed to the shaper heads of the machine. The tracing shaper machine tool has a track mounted vacuum feed table or chuck clamping thereon a template or pattern and the wood workpiece to be shaped. The table is manually positioned on the track to accommodate a wide range of workpiece sizes and this initially positioned table or chuck with the stacked template and workpiece vacuum clamped thereon is automatically biased toward a selectable speed driven upright shaper tool carrying spindle with a rotatable follower bearing surrounding the spindle receiving the periphery of the template thereagainst at a constant pressure. The feed table or chuck is rotated to provide a desired feed rate of the workpiece to the shaper tool, and this rotation continues somewhat beyond a 360° turn, whereupon the biasing means is reversed and the chuck retracted to its starting position on the track. A hold-down wheel is automatically pressed against the workpiece adjacent the peripheral edge being cut by the shaper tool to prevent jumping of the workpiece from the cutting action. The machine has an air logic system sequentially controlling the operating steps.

4 Claims, 10 Drawing Figures

AUTOMATIC SHAPER

BACKGROUND OF THE INVENTION

1. Field of the Invention

This invention relates to the art of automatic machine tools and particularly to spindle tracing shapers with logic systems which sequentially control the operation of the machine from start to finish.

2. Description of the Prior Art

Spindle shapers performing woodworking operations under the control of a fixture or template have heretofore required manual operations which are hazardous to perform and require the services of highly skilled operators. These machines have required fences, collars and the like to guide the workpiece against the shaper tool and although various pull-down devices, safety rings and the like have been provided, the operation requires positioning of the operator's hands close to the tool and considerable skill is needed in manipulating the workpiece relative to the guides.

It would, therefore, be an improvement in the art to provide a spindle tracing shaper with automatic controls which sequence the cutting operation from start to finish without exposing the operator to the shaper tool and without requiring skilled services of the operator.

SUMMARY OF THE INVENTION

According to this invention, a spindle tracing shaper is provided with a laterally extending track secured to the plate or table top of the machine from which the upright spindle projects. The track slidably supports a vacuum feed table or chuck which clamps a template or pattern and workpiece thereon under the influence of vacuum. The operator initially positions the chuck on the track to accommodate the selected pattern and workpiece to be shaped. Workpieces throughout a wide size range are thus easily accommodated. Then the operator secures the chuck to an automatic biasing device which draws the pattern against a rotatable bearing or stop on the spindle under a controlled constant load. The biasing means is preferably an air cylinder with a piston rod extension being selectively secured along the length thereof to the chuck for the initial positioning. A variable speed drive rotates the chuck to advance the workpiece against the shaper tool at a desired feed rate. The rotation continues beyond a full cutting cycle, preferably 440° rotation, then automatically stops, whereupon the biasing means retracts the chuck to its initial position. The vacuum is then shut off manually to permit manual removal of the finished workpiece.

A hood over the table top of the spindle shaper is connected to the suction side of a blower creating an air stream drawing off the wood chips. Opposing hold-down wheels, one fixed but removable and one movable to raised and lowered positions, secure the workpiece against axial vibration near the shaper spindle.

A brush suspended from the hood surrounds the shaper tool and spindle to trap the wood chips and further to protect the operator.

An air logic system controls the sequential operation of the vacuum loading, the biasing loading and the loading of the hold-down wheel. With relays regulating starting and stopping the table, and a vacuum system for the chuck providing a minimum of 20 inches of mercury vacuum pressure at the table, the table drive by an SCR (silicon control rectifier) drive, can vary table rotation from 0.33 to 14 R.P.M. The cycling system is interlocked preventing start until the vacuum pressure is at least 20 inches of mercury. Workpieces of from 9 inches to 72 inches are easily accommodated. The shaper blade tools are easily applied and removed and can be of the climb or conventional cut type.

The table top is mounted on a cabinet base at a convenient working height and the cabinet houses the spindle drive, mechanism for raising and lowering the spindle, vacuum pump, the sensors and other controls. The hood has a control panel on one face thereof.

Further objects and features of this invention will be understood from the following:

DESCRIPTION OF THE PREFERRED EMBODIMENTS

Figure 1:
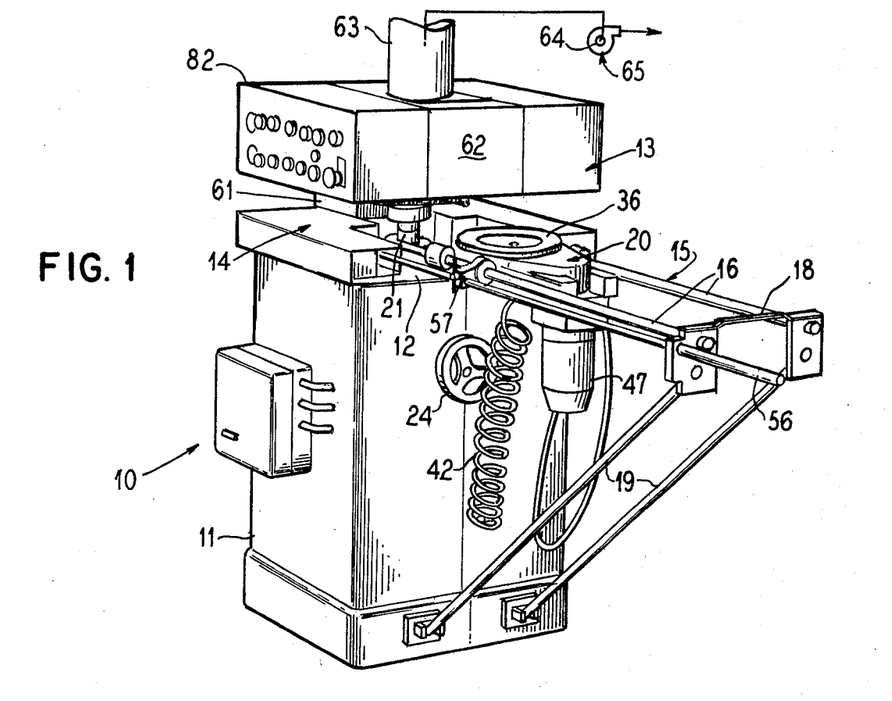
FIG. 1 is a perspective view of an automatic tracing shaper of this invention.
Figure 2:
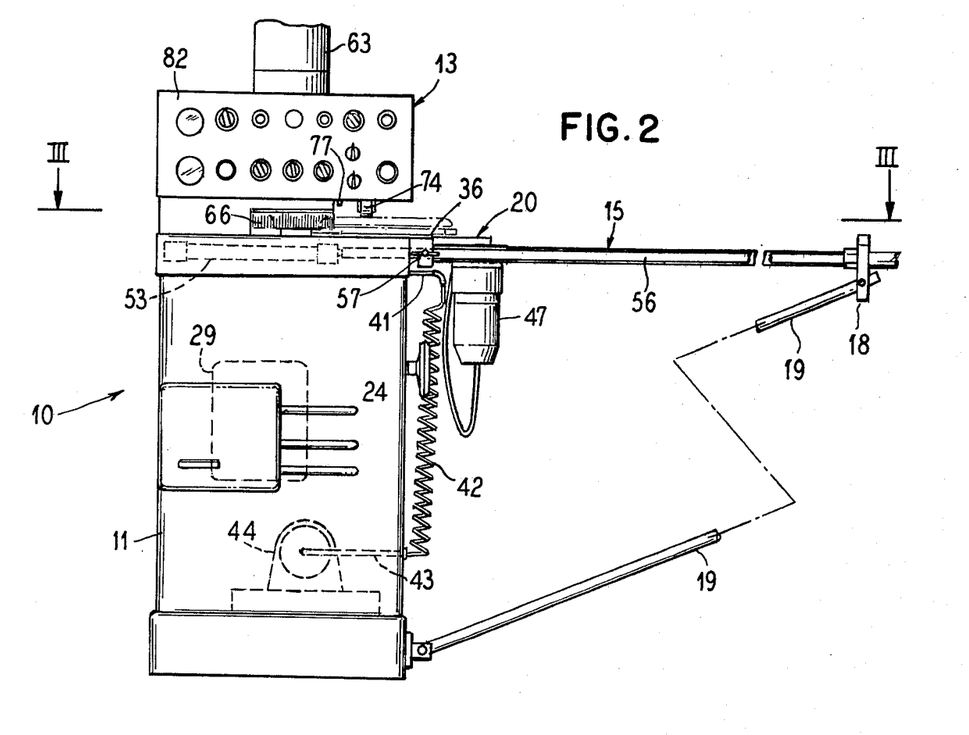
FIG. 2 is a side elevational view of the shaper of FIG. 1.
Figure 3:
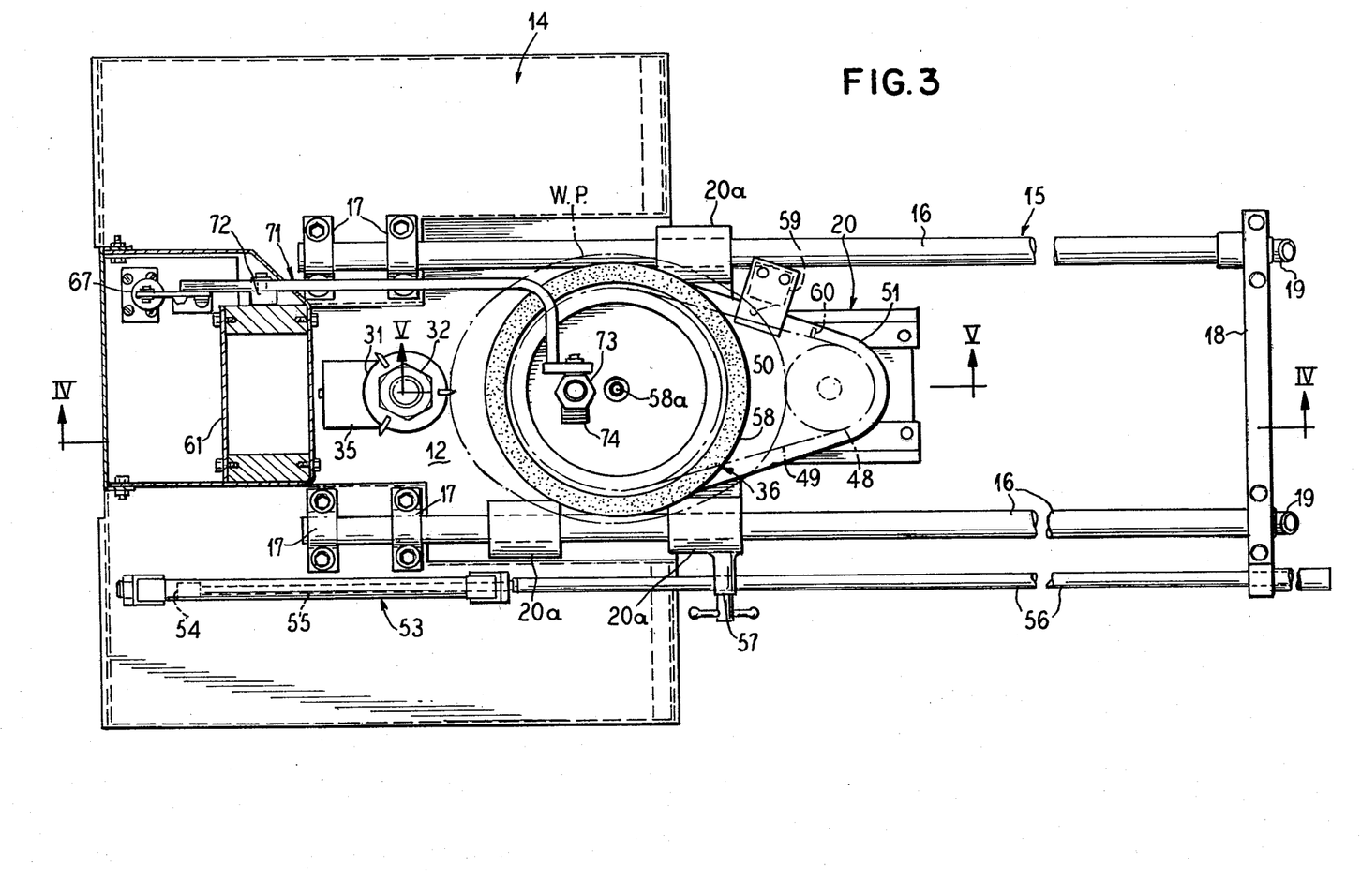
FIG. 3 is a sectional view with parts in plan, along the line III—III of FIG. 2.

The fully automated tracing spindle shaper 10 of this invention, as shown in FIGS. 1 and 2 has a generally rectangular cabinet base 11 with a table top 12 and an exhaust hood 13 overlying this. A box-like collar 14 on the table top 12 surrounds a central open front and open top work zone of the table top 12. The top of the collar 14 is flat and at a convenient height for the machine operator. The flat top of the collar 14 assists in the support of the workpiece. The front side of the cabinet base 11 has a track or slide support 15 projecting laterally from the open front portion of the table top or plate 12. This track 15 includes a pair of spaced parallel horizontal rods 16 with inner ends clamped by brackets 17 to the table top 12, as shown in FIG. 3. The outer ends of the rods 16 are secured in vertical brace connected plates or frames 18 supported by inclined rods 19 from the bottom of the cabinet base 11. The track 15 is thus rigidly supported from the machine base or frame 11 to hold the guide rail rods or tracks 16 in fixed spaced parallel horizontal relation.

A feed table or chuck carriage 20 is slidably supported on the rail rods 16 through anti-friction bearing equipped bosses 20a as shown in FIG. 3. This carriage therefore has a range of lateral movement projecting over the table top 12 all the way outwardly therefrom to the plates 18.

Figures 4, 4A:
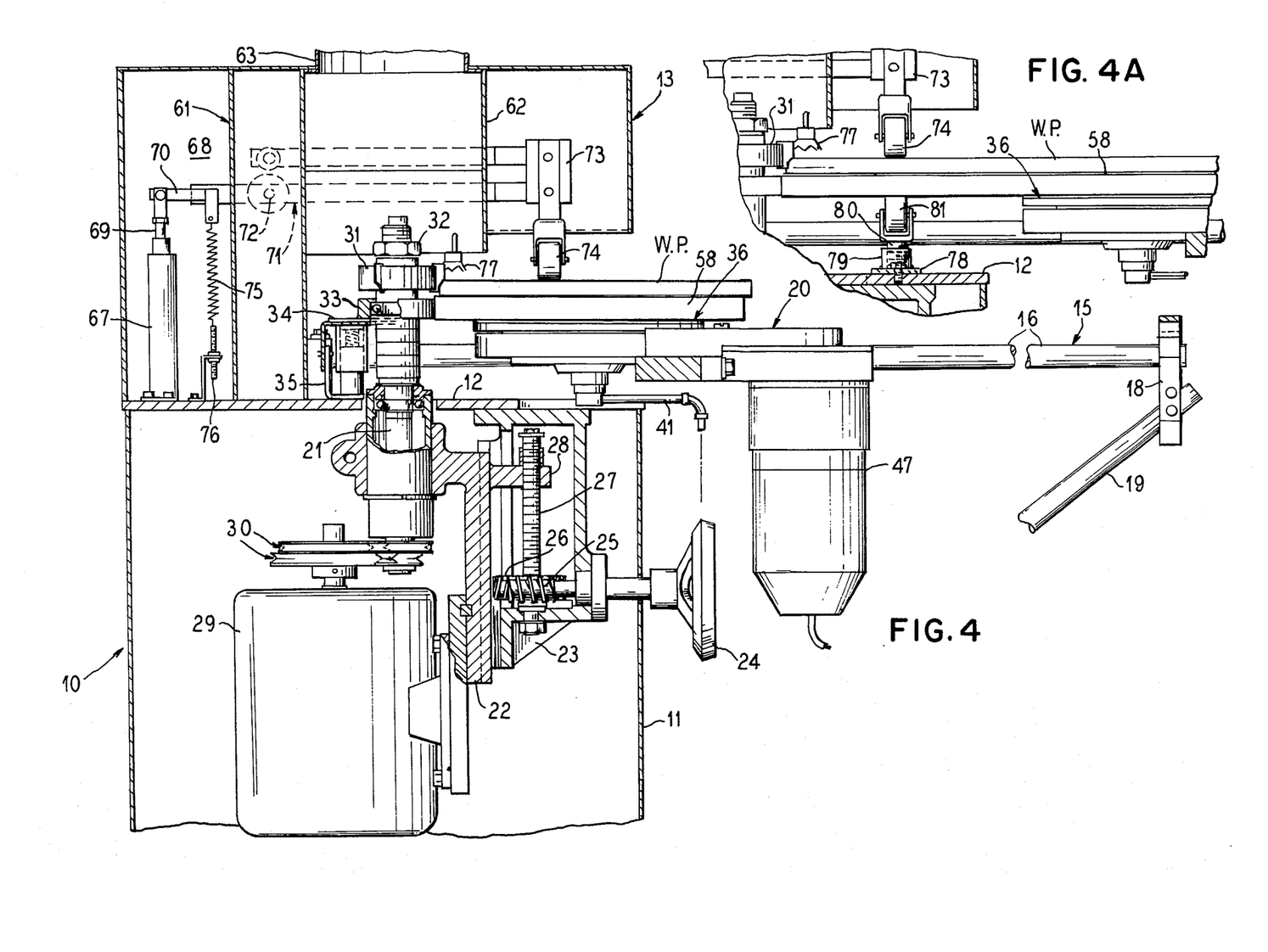
FIG. 4 is a sectional view, with parts in elevation, along the line IV—IV of FIG. 3.
FIG. 4A is a partial view of FIG. 4 but with the carriage in retracted position and showing a bottom clamp wheel bolted in position under the workpiece.

The vertical spindle 21 of the machine projects into the central area surrounded by the collar 14 and, as shown in FIG. 4, is rotatably supported at its lower end in the cabinet 11 by a vertically adjustable slide 22 supported on an upright base 23 depending from the top plate 12. The slide 22 is raised and lowered by rotation of a hand wheel 24 projecting from the front wall of the cabinet base 11 and rotating a worm 25 meshed with a gear 26 on an upright screw rod 27 threaded in a flange 28 of the slide 22.

The slide 22 also supports a 3600 RPM electric motor 29 with a multiple pulley and belt drive connection 30 to the spindle 21. The superimposed drive and driven pulleys of this drive connection have different diameters so that the belt may be exchanged therebetween to vary the range of speed from the motor 29.

The upper end of the spindle 21 is keyed to an easily applied and removed shaper head or tool 31. A nut 32 secures the head 31 in fixed position on the spindle.

An anti-friction bearing or collar 33 surrounds the spindle below the cutter head 31 and has a freely rotating outer race engaged by an underlying spring pressed friction pad 34 carried from a bracket 35 on the table top behind the spindle to hold the outer race of the bearing collar 33 against free rotation with the spindle.

Figure 5:
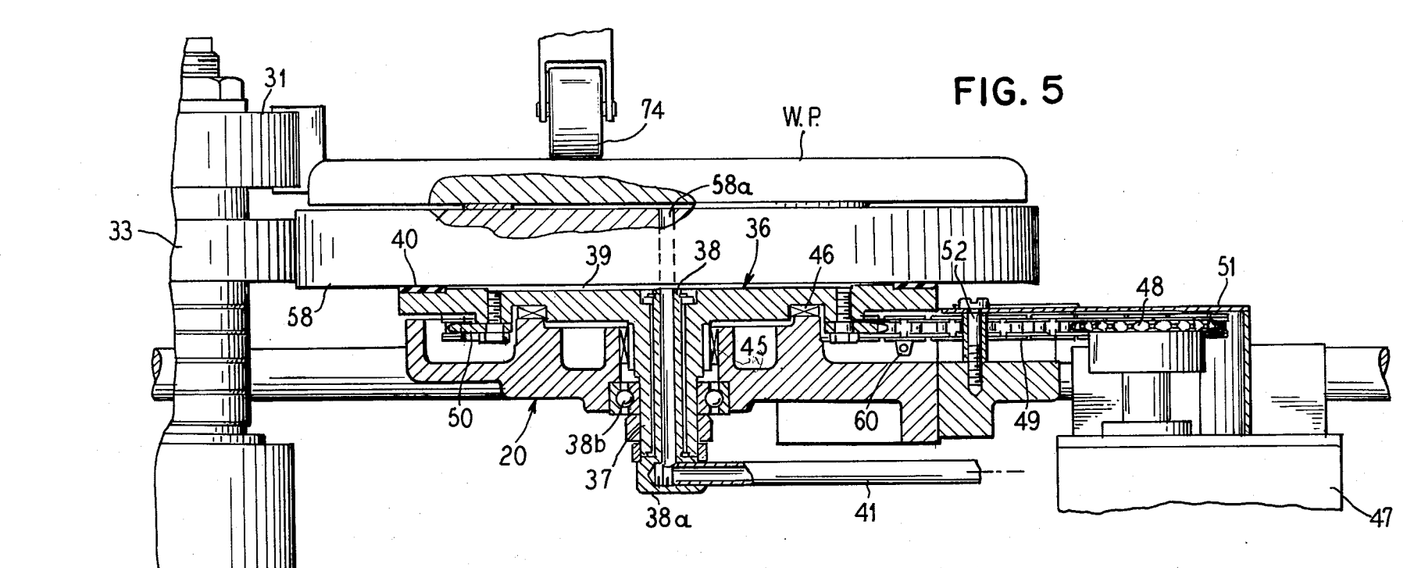
FIG. 5 is a longitudinal sectional view of the vacuum chuck and drive mechanism along the line V—V of FIG. 3.

The carriage 20 rotatably supports the feed table or chuck 36 as shown in FIG. 5. This table 36 has a central hollow stem 37 carried in anti-friction bearings 38b from the carriage 20 and the stem receives freely therethrough a non-rotatable vacuum tube 38 opening to the center of a recess 39 in the top face of the chuck 36 which is surrounded by a flexible seal or gasket 40. The bottom of the tube 38 has a head 38a below the stem 37 receiving a forwardly projecting vacuum tube or pipe 41 which, as shown in FIG. 2, is connected at its forward end to a depending expansible and contractible coiled tube 42, the lower end of which is connected through a tube 43 to the suction side of a vacuum pump 44 mounted in the bottom of the cabinet base 11.

Additional bearings are provided to stabilize rotation of the chuck 36 on the carriage 20, and as shown in FIG. 5, vertical needle bearings 45 surround the stem 37 above the main bearings 38b while horizontal needle bearings 46 underlie the bottom face of the chuck 36.

The chuck 36 is driven by a motor 47 suspended from the carriage 20 and having a horizontal drive sprocket 48 driving an endless chain 49 meshed around a larger sprocket 50 secured to the bottom of the chuck 36. The motor 47 is preferably of the direct current type delivering high torque to rotate the chuck through a broad feed range of, say, from 0.33 to 14 R.P.M.

A cover 51 overlies the sprocket 48 and the portion of the chain 49 beyond the chuck 36 being removably secured to the carriage 20 by fasteners such as 52, as shown in FIG. 5.

As shown in FIG. 3, a pneumatic jack with an air cylinder 53 is horizontally mounted on the plate 12 in the box-like collar 14 and has a piston 54 with a piston rod 55 projecting from the front end of the cylinder and secured to an external elongated rod 56 with an outer end slidable through a frame plate 18, and with an intermediate portion slidable through a screw clamp 57 projecting from a bearing 20a of the carriage 20. As the piston 54 is propelled in the cylinder 53, the elongated rod 56 will be driven to slide through a frame 18 and the clamp 57. However, when the clamp 57 is tightened, the carriage 20 will be driven by this piston 54. The carriage 20 is initially positioned on the track 15 to accommodate a workpiece of the selected size with its periphery closely adjacent the shaper tool 31, whereupon the clamp 57 is tightened and actuation of the air cylinder will bias the workpiece toward the shaper tool.

As shown in FIGS. 4 and 5, a centrally apertured template or pattern 58 is mounted on the chuck 36 resting on the gasket or seal ring 40 and having its central hole or aperture 58a aligned with the vacuum tube 38. A workpiece W.P. overlies this template 58 covering the aperture 58a. A sealing gasket 40a is also preferably interposed between the bottom of the workpiece and the top of the template. Suction applied through the tube 38 will thereby draw the workpiece W.P. tightly against the template 58 or interposed gasket 40a and the template in turn will be drawn tightly against the sealing gasket 40, whereupon the workpiece and its tracing pattern or template are securely clamped to the feed table or chuck 36.

The periphery of the template 58 is aligned with the collar or stop 33 and is biased thereagainst by the air cylinder 53 under a controlled air load causing the chuck to reciprocate on the track carrying the periphery of the workpiece W.P. against the shaper tool 31 under the influence of the template or pattern.

The table with its clamped on template and workpiece assembly is rotated by the motor 47 to advance the workpiece against the cutter head at a desired feed rate.

As shown in FIG. 3, a sensor 59 on the carriage 20 is tripped by a finger illustrated at 60 on the chain in FIG. 5 to stop the rotation of the chuck upon completion of the cutting cycle.

The hood 13 is supported on an upright frame 61 at the rear end of the table top 12 and has a central bonnet 62 overlying the shaper head 31 exhausting to a duct 63 which, as shown diagrammatically in FIG. 1, is connected to the inlet side 64 of an exhaust fan or blower 65 so that chips from the cutter head will be drawn through the bonnet 62 and exhausted through the duct 63. As shown in FIG. 2, a fringe curtain or brush 66 depends from the central bonnet 62 around the shaper tool 65 to direct the chips into the bonnet.

A pneumatic jack with an upright air cylinder 67 is mounted on the mounting plate 12 behind the support frame 61 in a closed compartment 68 with its piston rod 69 pinned at its upper end to a bracket 70 extending from the rear end of a parallelogram linkage 71 pivoted to the frame 61 at 72. This parallelogram linkage 71 supports, at its front end, a bracket 73 from which depends a roller 74 adapted to ride on the workpiece W.P. as shown in FIG. 4. The bracket 70 is also secured to the upper end of a coil spring 75 anchored through an adjustable screw 76 to the table top 12. When the air cylinder 67 is actuated to raise the piston rod 69, the parallelogram linkage will be tilted to press the roller 74 against the workpiece, but when the air is released from the cylinder 67, the spring 75 will raise the roller 74 off of the workpiece. This provides a hold-down claw riding on the workpiece near the cutter 31 to prevent vibration of the workpiece during the cutting action.

The air cylinder 67 may be automatically sensed from an proximity sensor 77 having an air nozzle discharging on top of the workpiece which offers a resistance to the discharge. The air cylinder, of course, can be supplied with air at selected pressures to control the hold-down force of the roller 74.

As shown in FIG. 4A, when a large workpiece W.P. and template 58 extend beyond the periphery of the chuck or table 36, the chuck is, of course, retracted from the FIG. 4 position and a caster wheel carrying plate 78 is bolted on the top 12 under the roller 74. The plate 78 has an upstanding internally threaded boss 79 into which is threaded the stem 80 of a caster wheel or roller 81. The height of the roller is adjusted to ride on the under face of the template or, if the workpiece projects beyond the template, on the under side of the workpiece, to cooperate with the roller 74 for holding the workpiece in a flat plane and dampening vibration.

A control panel 82 on a side of the hood 13 has switches and indicators to set up the shaper for automatic operation.

Figure 6:
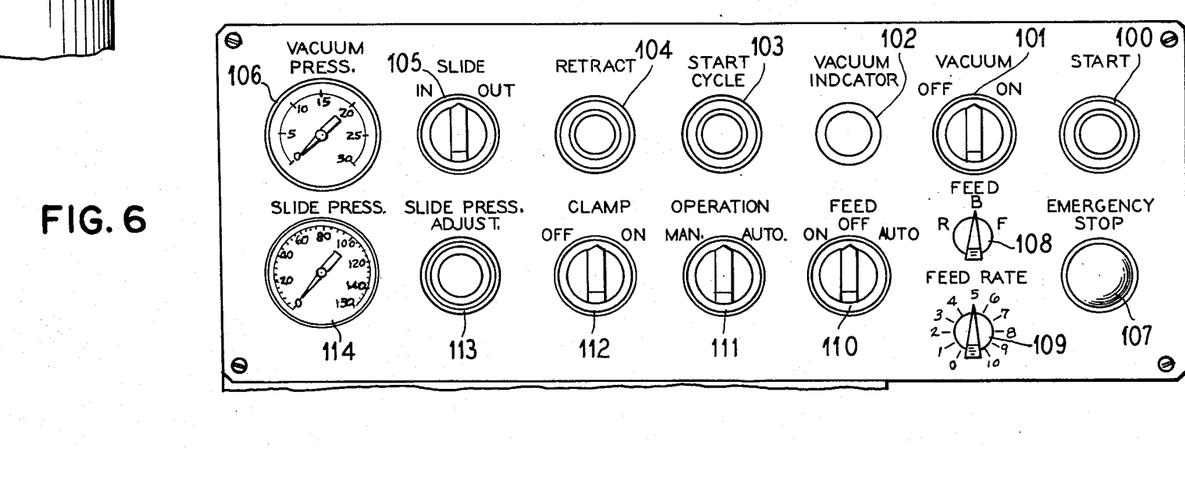
FIG. 6 is a view of the control panel.

The control panel of FIG. 6 contains switches in the form of buttons, and rotating handles, visual indicators, and dials. The legends on the panel designate generally the function of each switch or indicator. Starting from the right-hand end of the panel, in the top row, is a push button start switch 100, a rotating or turn vacuum switch 101, a vacuum indicator light 102, a starting cycle push button switch 103, a retracting push button switch 104, a rotating turn switch 105, and a vacuum pressure dial 106. In the bottom row, from right to left, is a push button emergency stop switch 107, a rotating feed switch 108 with three positions "B" (brake), "R" (reverse) and "F" (forward). Below this feed switch is a rotating rheostat switch 109 for controlling the feed rate. Symbols from 0 through 10 designate various speeds controlled by this switch. To the left of the feed rate switch is a rotating turn switch 110 having a central "off" position, an "on" position to the left, and an "automatic" position to the right. The next switch 111 is of the rotating or turn type and has a manual position and an automatic position. The following switch 112 also of the turn type is a clamp switch with an off and on position. A rotating dial type switch 113 adjusts the pressure of the air cylinder 53 controlling the sliding of the chuck carriage on its track. The dial 114 indicates the air pressure in this cylinder 53.

Figure 7:
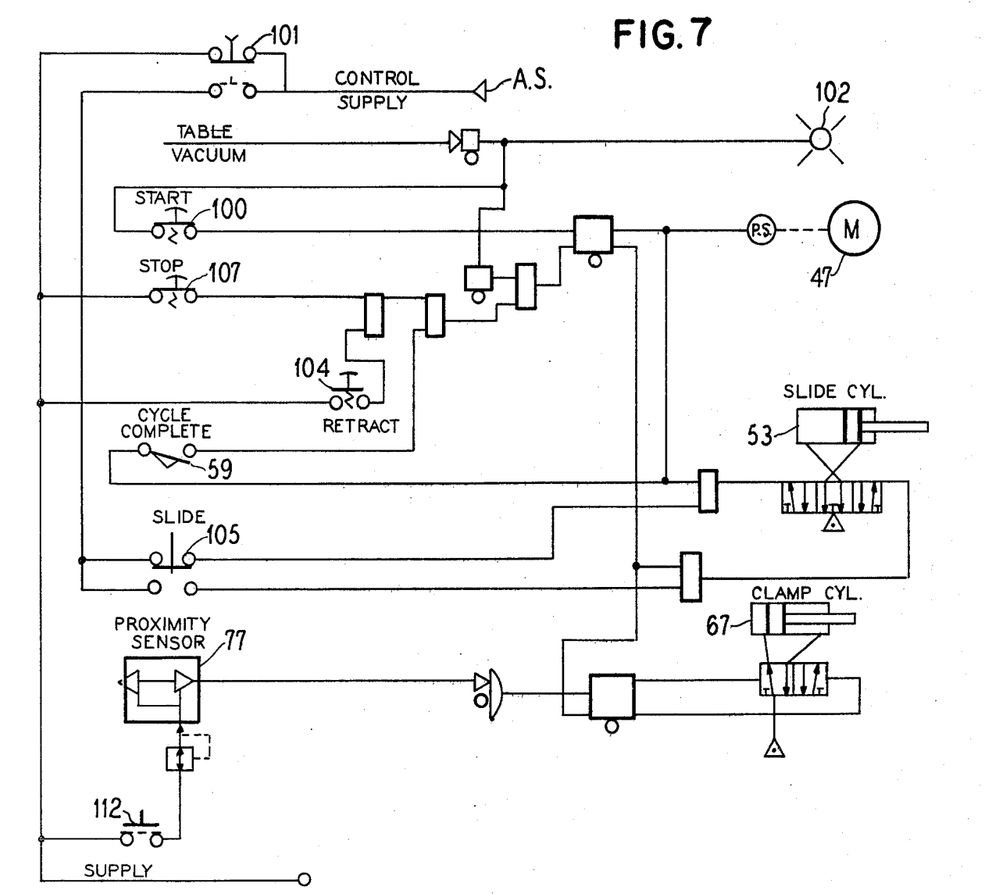
FIG. 7 is a cycle flow diagram of the pneumatic logic controls.

The cycle flow diagram of FIG. 7 illustrates the switches and indicators of FIG. 6 and the shaper components controlled thereby from a shop source of compressed air. The air supply input is indicated at "A.S.". The switches in this diagram and the mechanisms or components controlled thereby have been marked with the same reference numerals used in FIG. 6, and in the above description of the mechanisms. As shown in this diagram, the "vacuum" switch 101 controls the air supply through two pneumatic circuits with an "on" position supplying vacuum to the chuck and an "off" position releasing the vacuum to permit removal of the workpiece from the chuck. The air supplied to the machine, however, continues through both positions of the switch 101.

Figure 8:
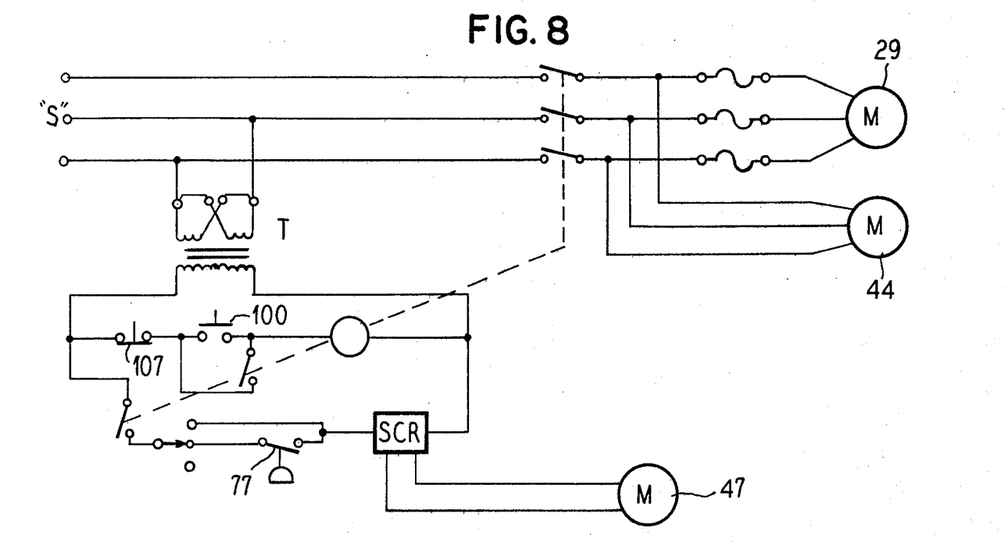
FIG. 8 is an electric circuit diagram for the motors.

FIG. 8 is an electrical diagram illustrating electrical power input to the three electric motors of the machine. As shown, the spindle motor 29 and the motor for the vacuum pump 44 are energized through a three-phase high voltage supply "S" with a step down transformer "T" reducing the voltage to a circuit controlling the DC motor 47 through the rectifier. The switches in this circuit also control the motor drive.

Figure 9:
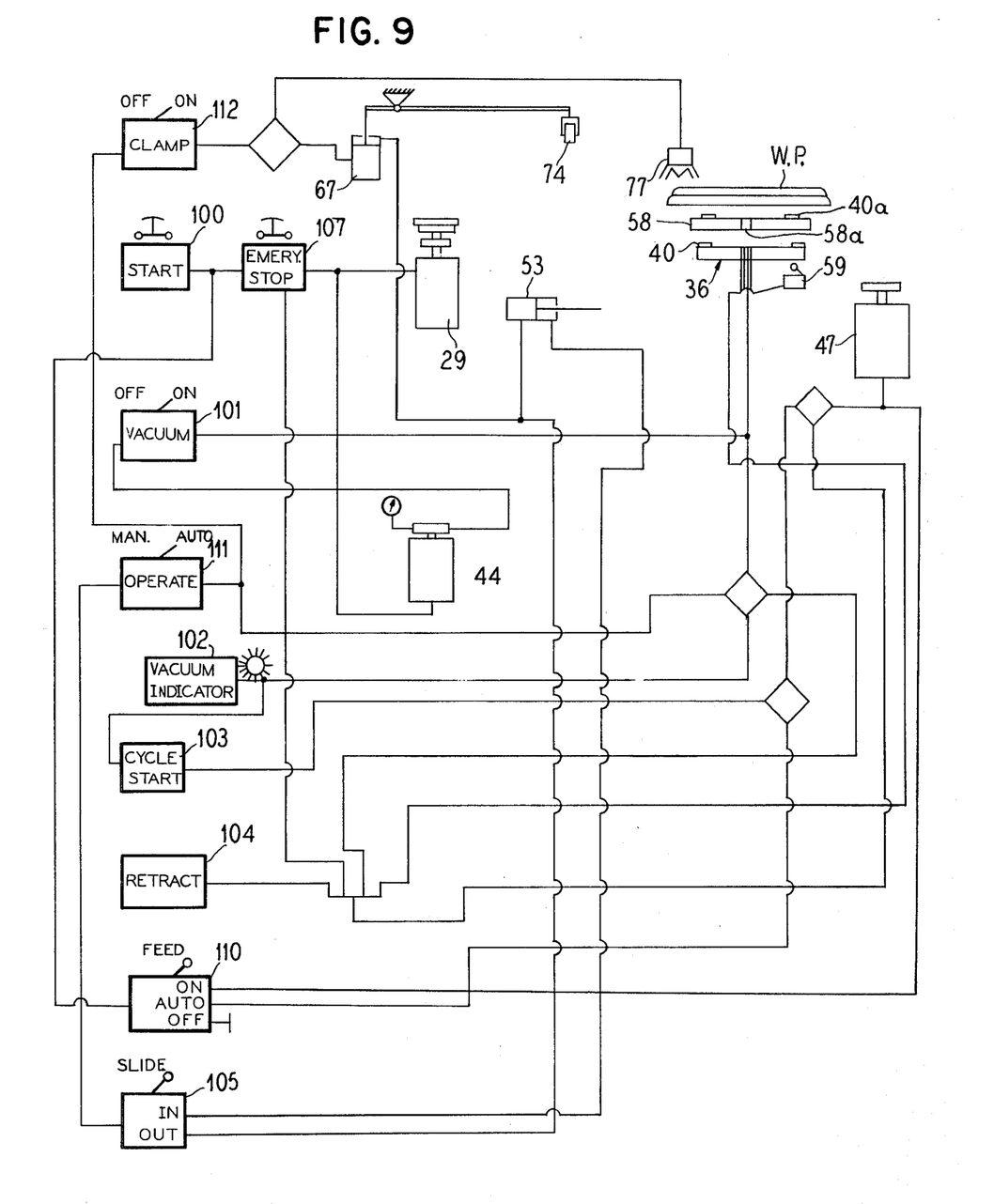
FIG. 9 is a cycle diagram of operation of the shaper.

In the diagram of FIG. 9, the switches and indicators of FIG. 6 are shown in circuit relation with the devices which they control. The same reference numerals have been used for these devices and switches.

The following table is an operational description of the controls and sequence of operation of the pneumatic, electrical, and vacuum actuated units of the shaper machine. In this table, column 1 shows the symbols of the switches corresponding with the panel showing of FIG. 6, column 2 identifies the switches by the same numbers used in FIGS. 6 through 9, column 3 lists the various conditions of air, electrical and vacuum input to the machine, while column 4 shows the function of the switches.

| SWITCH SYMBOL | SWITCH NUMBER | CONDITION | FUNCTION |
| --- | --- | --- | --- |
| Start | 100 | Power to Machine | Starts spindle motor 29 Vacuum pump 44 Closes circuit to DC drive switches for motor 47. |
| Vacuum ON/OFF | 101 | Air to Machine Vacuum Pump On | Open valve to supply vacuum to table 36 "OFF" Releases (W.P.) workpiece "ON" holds workpiece in place |
| Vacuum Indicator | 102 | Vacuum "ON" with workpiece making good seal | Shows operator when there is adequate vacuum to hold part in place and let cycle start |
| Start Cycle | 103 | Vacuum indicator "ON" Rotary table clear of limit 59 | Starts cycle as follows: 1. Retracts slide cylinder moving slide towards cutter. |
| "Feed" switch | 113 | | 2. Starts DC drive motor 47 |
| "Auto" "Clamp" switch "On" | 112 | | 3. Allows proximity sensor 77 to close clamp 74 4. Rotates table through approximately 440° |
| | | Rotary table limit 59 contact | 5. Stops table rotation 6. Extends slide cylinder 53, moving slide 20, away from spindle 7. Opens clamp 74 if closed |

-continued

| SWITCH SYMBOL | SWITCH NUMBER | CONDITION | FUNCTION |
|---|---|---|---|
| Retract | 104 | Machine in operation in mid-cycle | Stops cycle, accomplishes steps 5,6,7 above before table limit 59 contact is made |
| Slide "In" "Out" | 105 | Operation Switch 111 to Manual | "In" retracts cylinder 58, slide 20 moves in "Out" extends cylinder 63 slide 20 moves out |
| Vacuum Press | 106 | "Vacuum" "ON" 101 vacuum pump running, seal made at table | Shows vacuum press maintained in system |
| Slide Press | 114 | Air to Machine | Monitor air pressure on slide cylinder 53 |
| Slide Press Adjust | 113 | Air to Machine | Adjust press to slide cylinder 53 |
| Clamp "ON" "OFF" | 112 | Operation Switch "AUTO" | Activates and deactivates clamp 74 (not used for smaller workpieces) |
| Operation Man Auto | 111 | | Activates the slide "IN" "OUT" allowing the machine to be run manually |
| Feed ON/OFF/ AUTO | 113 | Machine ON Start 100 activates | Operates DC drive 47 that operates table rotation "ON", closes circuit to DC drive rotating table 20 "OFF", Opens circuit to DC drive 47 "AUTO", closes circuit to pressure switch which allows the DC drive 47 to rotate the table 36 automatically |
| Feed "R" "B" "F" | 108 | | Reverses Rotary Table 36 "R" Reverse, reverses rotary table "B" Brake, stops rotary table "F" Forward, table rotates in opposite direction of reverse |
| Feed Rate | 109 | | Controls the speed the rotary table 36 rotates feeding the work through the cutter 31 |
| Emergency Stop | 107 | Machine Running | Stops all machine operations 1. Stops spindle motor, vacuum pump, and table rotation |
| | | Machine in Operation Mid-cycle | 2. Extends slide cylinder 53 3. Opens clamp 74 if closed |

It should be understood that while the air supply is illustrated in the diagram of FIG. 7 as a conventional machine shop compressed air source, the machine could be equipped with an air compressor energized, for example, from a separate electrical motor which would be energized through a circuit controlled by the switch 101.

From the above description, it will be understood that compressed air, vacuum, and electrical inputs are used to operate the components of the machine and pneumatic and electric circuits are provided with valves and switches to sequence the operation of the components as determined from a control panel on the machine. Conventional symbols for switches and valves have been used in the diagrams in FIGS. 7-9.

The above described machine of this invention is operated as follows:

OPERATION

With the carriage 20 in a retracted position away from the cutter head 31 and the clamp 57 in its released position, a template is centered on the chuck 36 covering the gasket or seal 40 and a workpiece W.P. is superimposed over the template thus covering the template aperture 58a. The carriage 20 is then advanced on the track 15 to position the template closely adjacent the bearing or collar 33 whereupon the clamp 57 is tightened, securing the chuck carriage 20 to the rod 56 of the air cylinder 53.

The start button 100 on the control panel 78 is then manually actuated to initiate rotation of the spindle drive motor 29 and the vacuum pump 44.

The on/off switch 101 on the control panel 78 is manually turned to the "ON" position supplying a vacuum load to the chuck 36 sufficient to securely clamp to workpiece and the template to the chuck 36. The sensor 77 in the air logic circuit checks for adequate vacuum pressure giving an indication on control panel 78 at 102. The cycle start button 103 is then manually activated causing the slide 20 to be pulled inward by the cylinder rod 55 pressing the template against the bearing stop 33, and actuating the chuck motor 47 for feeding the workpiece at a selected rate against the shaper tool or cutter head 31. Air is also admitted under the piston in the cylinder 67 through a supply line also vented through the sensor 77. If the air issuing from the sensor is blocked by the workpiece, the air pressure under the piston will raise the piston rod 69 tilting the linkage 71 and pressing the roller 74 on the workpiece.

The motor 47 rotates the chuck through a complete cycle, whereupon the sensor 59 is tripped to deenergize the motor, stopping the chuck 36, raising the wheel 74 off of the workpiece and extending cylinder 53, thereby retracting the carriage 20 back to its starting position. The vacuum on/off switch 101 is manually turned to the "OFF" position releasing the workpiece (W.P.). The chuck having been rotated about 440° is already in a position to receive the next workpiece.

It will be especially noted that the entire cycle of operation from start to finish after the operator has placed the workpiece on the chuck is fully automated, and the operator's hands are never near the cutter head 31.

It will be apparent to those skilled in the art that many modifications and variations may be effected without departing from the spirit and scope of the novel concepts of the present invention.

We claim as our invention:

1. An automatic shaper tool having a cutter head, a pattern stop adjacent said head, a chuck, means for detachably securing a pattern and a workpiece on the chuck, a chuck support slidably mounted for moving the chuck toward and away from said stop, a fluid pressure actuated jack having a piston rod, a releasable clamp on said chuck support selectively engaging and disengaging said piston rod, means feeding fluid pressure into opposite ends of said jack for reciprocating said piston rod to bias the chuck support toward said stop and to retract the chuck support when said clamp engages the piston rod and accommodating manual sliding of said chuck support toward and away from said stop when said clamp is disengaged, an electric motor suspended from said chuck support for rotating the chuck to feed a workpiece thereon to the cutter head, and a control automatically and sequentially energizing the means to secure the pattern and workpiece to the chuck, to flow fluid into and out of the jack to bias the chuck toward the stop, to energize the electric motor to rotate the cutter head, to stop the motor upon completion of a cutting cycle, to reverse fluid flow to the jack for retracting the chuck away from the stop, and to release the workpiece from the chuck whereby the only required manual operations for a complete cutting cycle are the loading and unloading of the workpiece and the opening and closing of the clamp.

2. An automated machine tool comprising a cutter, a power operated chuck, means slidably mounting said chuck for movement toward and away from said cutter, a fluid pressure operated jack having a piston rod along side said chuck, a releasable clamp selectively connecting the chuck to the piston rod, means selectively feeding fluid under pressure into opposite ends of said jack to control the position of the chuck relative to the cutter when the clamp is closed, and said chuck being manually slidable toward and away from the cutter when the clamp is opened.

3. An automated machine tool having a cutter head, a pattern stop adjacent said head, a work support chuck detachably mounting a pattern and a workpiece, a pneumatic jack with a piston rod selectively clamped to the chuck for biasing the chuck to hold the pattern against the stop, means for rotating the chuck to feed the workpiece to the cutter, and control means for automatically actuating the jack and the means for rotating the chuck through a cycle feeding the workpiece to the cutter head under a controlled load at a selected feed rate and retracting the workpiece from the cutter upon completion of the cutting cycle.

4. An automated machine tool having a cutter head, a pattern stop adjacent said head, a work support chuck detachably mounting a pattern and a workpiece, means for biasing the chuck to hold the pattern against the stop, means for rotating the chuck to feed the workpiece to the cutter, control means for automatically actuating the biasing means and the means for rotating the chuck through a cycle feeding the workpiece to the cutter head under a controlled load at a selected feed rate and retracting the workpiece from the cutter upon completion of the cutting cycle, a track mounted slide supporting the chuck for movement toward and away from the cutter head, said means for biasing the chuck including a pneumatic jack having an elongated piston rod and a clamp for selectively securing the piston rod to said slide, and the control means for automatically actuating the biasing means including means for adjusting the air load on the jack to control the bias of the chuck.

* * * * *

UNITED STATES PATENT AND TRADEMARK OFFICE
CERTIFICATE OF CORRECTION

PATENT NO. : 4,450,882

DATED : May 29, 1984

INVENTOR(S) : Lonnie G. Hitchcock and Richard J. Flanigan

It is certified that error appears in the above—identified patent and that said Letters Patent is hereby corrected as shown below:

On the title page

Page 1, after the identification of the inventors at [76] insert: [73] Assignee: Houdaille Industries, Inc., Fort Lauderdale, Florida Signed and Sealed this Ninth Day of October 1984

[SEAL]

Attest:

*Attesting Officer*

GERALD J. MOSSINGHOFF

*Commissioner of Patents and Trademarks*